United States Patent [19]

Lerot et al.

[11] Patent Number: 5,032,375
[45] Date of Patent: Jul. 16, 1991

[54] PROCESS FOR THE MANUFACTURE OF BARIUM TITANATE AND/OR STRONTIUM TITANATE CRYSTALS

[75] Inventors: Luc Lerot, Brussels; Henri Wautier, Braine-Le-Comte, both of Belgium

[73] Assignee: Solvay & Cie, Brussels, Belgium

[21] Appl. No.: 356,502

[22] Filed: May 23, 1989

[30] Foreign Application Priority Data

Jun. 13, 1988 [BE] Belgium .............................. 08800674

[51] Int. Cl.$^5$ .............................................. C01G 23/00
[52] U.S. Cl. ..................................................... 423/598
[58] Field of Search ......................................... 423/598

[56] References Cited

U.S. PATENT DOCUMENTS

| | | |
|---|---|---|
| 4,061,583 | 12/1977 | Murata ................................ 423/598 |
| 4,487,755 | 12/1984 | Arendt ................................. 423/598 |
| 4,520,004 | 5/1985 | Uedaira ............................... 423/598 |
| 4,534,956 | 8/1985 | Arendt ................................. 423/598 |
| 4,898,843 | 2/1990 | Matushita ........................... 423/598 |
| 4,937,213 | 6/1990 | Bernier ................................ 423/598 |

*Primary Examiner*—Peter D. Rosenberg
*Attorney, Agent, or Firm*—Spencer & Frank

[57] ABSTRACT

An amorphous powder of titanium oxide and of barium and/or strontium oxide is precipitated by the hydrolysis of titanium alcoholate in the presence of barium oxide, hydroxide or alcoholate or strontium oxide, hydroxide or alcoholate and an acid organic compound containing more than 6 carbon atoms, and the amorphous powder is heated while being treated with a stream of gas containing water vapour, ammonia or $CO_2$, to crystallize the barium or strontium titanate and distill off the acid organic compound. The barium or strontium titanate crystals are less than one micron in size and have an irregular, angular morphology.

10 Claims, 3 Drawing Sheets

PROCESS FOR THE MANUFACTURE OF BARIUM TITANATE AND/OR STRONTIUM TITANATE CRYSTALS AND BARIUM TITANATE AND/OR CRYSTALS

The present invention relates to a process for the manufacture of barium titanate and/or strontium titanate crystals, as well as to barium titanate and/or strontium titanate crystals having a novel morphology.

Powders composed of barium titanate or strontium titanate crystals find application in various fields of the art, in particular in the ceramics industry and for the manufacture of electronic components. In these applications, finely divided powders composed of regular crystals less than one micron in size and which are well suited to the techniques of shaping and sintering, are generally sought.

In U.S. Pat. No. 3,647,364 (United States of America—Secretary of the Air Force), a process is described for manufacturing barium titanate or strontium titanate crystals, according to which a titanium alcoholate and a barium or strontium alcoholate are dissolved in a suitable organic solvent and the resulting organic solution is treated with water, under conditions adjusted for cohydrolyzing the alcoholates and precipitating the titanium oxide and the barium or strontium oxide in the state of a finely divided amorphous powder. The latter is then subjected to a calcination treatment at a temperature of at least 700° C. in order to crystallize the barium or strontium titanate. In general, the powders of barium or strontium titanate crystals obtained after this known process contain agglomerates, which is detrimental to the subsequent sintering operations.

The invention remedies this drawback by providing a new process which enables barium titanate and/or strontium titanate crystals to be obtained in the state of finely divided powders virtually free from agglomerates.

Accordingly, the invention relates to a process for the manufacture of barium titanate and/or strontium titanate crystals comprising a coprecipitation of titanium oxide and of barium oxide and/or strontium oxide in the state of an amorphous powder and heating the amorphous powder to a temperature above 400° C.; according to the invention, the process is characterized in that, during the coprecipitation, a titanium alcoholate is hydrolyzed in the presence of a barium and/or strontium compound selected from the oxides, hydroxides and alcoholates and an acid organic compound containing more than 6 carbon atoms in the molecule, and in that, during the heating of the amorphous powder, the particles forming the latter are fragmented by distilling off the acid organic compound in a stream of gas which is passed in contact with the powder, the said stream of gas comprising a gas selected from water vapour, ammonia and carbon dioxide and being free from oxygen.

In the process according to the invention, the coprecipitation consists of a simultaneous precipitation of titanium oxide and of barium oxide and/or strontium oxide.

The amorphous powder is a powder composed of noncrystalline solid particles (that is to say a glass possessing isotropic properties) of mixed metal oxides of titanium and of barium and/or strontium. Mixed metal oxides are, by definition, a solid solution, that is to say a mixture which is homogeneous at the molecular or ionic level.

Heating the powder has the function of inducing the crystallization of the mixed oxides of titanium and of barium and/or strontium. It must consequently be performed at a temperature above 400° C., under conditions which can be defined by a routine laboratory study. The temperature of the powder must remain below 1,000° C. in order to avoid sintering.

According to the invention, to coprecipitate the titanium oxide and the barium oxide and/or strontium oxide, a titanium alcoholate is hydrolyzed in the presence of a barium and/or strontium compound which is a barium and/or strontium oxide, hydroxide or alcoholate.

In the process according to the invention, a metal alcoholate is any compound in which a metal is linked via an oxygen atom to a hydrocarbon group such as an aromatic group or a saturated or unsaturated, linear or cyclic aliphatic group which is unsubstituted or partially or completely substituted. Metal alcoholates containing aliphatic groups are especially recommended: those containing unsubstituted saturated aliphatic groups are preferred, such as, for example, methyl, ethyl, n-propyl, isopropyl, n-butyl and isobutyl groups.

The hydrolysis of metal alcoholates is a well known technique for the production of metal oxide powders (Better Ceramics Through Chemistry—Materials Research Society Symposia Proceedings—Vol. 32—19-84—Elsevier Science Publishing Co., Inc.—BRUCE FEGLEY et al.: "Synthesis, characterization and processing of monosized ceramic powders", pages 187 to 197; U.S. Pat. No. 4,543,341). In the process according to the invention, the function of the hydrolysis is to decompose the titanium alcoholate and, where appropriate, the barium and/or strontium alcoholate. It is performed in the presence of an acid organic compound containing more than 6 carbon atoms in the molecule.

Acid organic compound is understood to denote an organic acid or a derivative of an organic acid. The organic acid derivative can be acidic in nature or be devoid of acidic nature, in which case it is, for example, a neutral substance. Saturated or unsaturated carboxylic acids and their derivatives are especially recommended. It is appropriate to select acids or acid derivatives containing more than six carbon atoms in their molecule. Carboxylic acids which have proved especially advantageous are those containing at least eight carbon atoms in their molecule, such as octanoic, lauric, palmitic, isopalmitic, oleic and stearic acids. Carboxylic acids comprising more than ten carbon atoms in their molecule are preferred. Examples of organic acid derivatives which are usable in the process according to the invention are the anhydrides, esters and salts of these acids.

It has been observed that the acid organic compound affects the morphology of the amorphous powder of mixed metal oxides which is obtained after the hydrolysis, inhibiting agglomeration of the particles forming the powder and imparting a spherical profile to these particles. As a general rule, it should be employed in a sufficient amount for its action to be manifested on the morphology of the powder while avoiding, however, exceeding a threshold beyond which its action on the quality of the powder could be negative. In practice, the optimum amount of acid organic compound which should be employed depends on many parameters including, in particular, the acid organic compound selected (mainly the length of its carbon chain) as well as the working conditions, and it must be determined in each particular case in accordance with the quality required for the morphology of the amorphous powder. In general, it is recommended to employ a mass of acid organic compound of between 20 and 200 g per mole of barium titanate and/or strontium titanate to be produced. Amounts of between 50 and 150 g are preferred in the case where the acid organic compound is selected from carboxylic acids.

The hydrolysis may be performed in the ambient air. However, to avoid an uncontrolled decomposition of the titanium alcoholate and, where appropriate, of the barium and/or strontium alcoholate, it is desirable that the hydrolysis be performed under a gaseous atmosphere free from moisture. It is, moreover, recommended to avoid the presence of $CO_2$ in the gaseous atmosphere in the case where the hydrolysis is performed in the presence of barium oxide or hydroxide or strontium oxide or hydroxide, in order to avoid carbonation of this compound. Dry carbonate-free air, nitrogen and argon are examples of atmospheres which are usable in the process according to the invention.

In principle, the temperature and pressure are not critical. In general, in most cases, it is possible to work at room temperature and normal atmospheric pressure.

In performing the process according to the invention, the hydrolysis is adjusted in order to precipitate the mixed oxides in the state of a powder, without forming a gel. To this end, it is recommended to produce a homogeneous mixture of the titanium alcoholate, the barium and/or strontium compound, water and the acid organic compound as quickly as possible before nucleation begins. To this end, in a preferred embodiment of the process according to the invention, the titanium alcoholate, the barium and/or strontium compound and the water are employed in the state of organic solutions. Where appropriate, it is recommended that the organic solvent for the alcoholate be free from water. It is, moreover, recommended to avoid the presence of solid particles in the organic solutions. Identical or different organic solvents can be used for the titanium alcoholate, the barium and/or strontium compound and the water. In the case of different organic solvents, it is generally recommended that the latter be miscible. Alcohols and their derivatives are very suitable, in particular methanol, ethanol, n-propanol, isopropanol, n-butanol and isobutanol. The optimum degrees of dilution of the titanium alcoholate, the barium and/or strontium compound and the water in their respective organic solvents depend on various factors, in particular on the titanium alcoholate and the barium and/or strontium compound employed, the amount and nature of the acid organic compound selected, the working temperature and the quality required for the amorphous powder. They should be determined in each particular case by a routine laboratory study. For example, it is advantageously possible to employ alcoholic solutions in which the respective contents of titanium alcoholate and of barium and/or strontium compound do not exceed 5 moles per liter and are preferably between 0.02 and 0.5 mole per liter.

Various procedures are possible for performing the hydrolysis.

According to a first procedure, the acid organic compound as well as solutions, in an organic solvent, of the titanium alcoholate, the barium and/or strontium compound and water are introduced separately but simultaneously into a reaction chamber.

According to a second procedure, which is preferred, barium and/or strontium hydroxide or oxide is selected, a homogeneous premixture of the said hydroxide or oxide with water is prepared in a common organic solvent, for example an alcohol, the acid organic compound is added to the titanium alcoholate and all the reactants are then combined.

In each of these procedures, it is possible to work in the manner described in Patent Application GB-A-2,168,334.

In an advantageous variant of the second procedure which has just been described, a hydrated barium and/or strontium hydroxide dissolved in an organic solvent is employed, the water of hydration of the hydroxide constituting at least a part of the water needed for the hydrolysis reaction. It is preferable to select a hydrated hydroxide in which the degree of hydration is sufficient to provide all the water needed for hydrolysis of the titanium alcoholate.

Further features and details relating to the hydrolysis are described in Patent Applications EP-A-286155 and FR-A-2617151 (SOLVAY & Cie).

After the hydrolysis reaction, a powder of fine particles is collected, which consist of a complex mixture of mixed oxides of titanium and of barium and/or strontium in the amorphous state, more or less hydrated, and organic residues. The powder is chiefly composed of generally spherical particles having a diameter not exceeding 5 microns, and usually between 0.05 and 2 microns. The organic residues present in the amorphous powder comprise the acid organic compound, which occurs therein chemically bound to the mixed oxides, and, where appropriate, the organic solvents which have been employed for the hydrolysis.

The powder can optionally undergo drying in order to remove the water and organic solvents contained therein. Where appropriate, the drying can be performed in a controlled atmosphere, free from oxygen, and at a temperature below the boiling point of the acid organic compound. In practice, it is performed under an inert atmosphere (for example under nitrogen or argon), at a temperature below 200° C., and preferably not exceeding 100° C.

After the hydrolysis and, where appropriate, the drying, the amorphous powder is subjected to heating in a crystallization chamber, under conditions adjusted for crystallizing the barium and/or strontium titanate. According to the invention, during the heating, the particles of the amorphous powder are fragmented by means of a special operating process which consists in passing a suitable stream of gas in contact with the powder, in order to distill off and carry away, in the stream, the acid organic compound present in the powder. To this end, the stream of gas must comprise a gas selected from water vapour, ammonia and carbon dioxide, and it must be at a sufficient temperature to distill off the acid organic compound under the pressure conditions employed. This then gives rise to a fragmentation of the generally spherical particles of the amorphous powder, through the effect of the distillation of the acid organic compound and of carrying away the latter in the stream of gas. It is essential that the stream of gas does not contain oxygen or any other oxidizing gas. It can optionally contain an inert gas, which does not react with the acid organic compound and the mixed oxides forming the powder, for example nitrogen or argon. In practice, its content of water vapour, ammonia and/or carbon dioxide must be sufficient to obtain the fragmentation of the particles. The optimum content will depend on various parameters, including the size of the particles of the amorphous powder, the nature and amount of the acid compound employed in the hydrolysis stage, the technological aspects of the crystallization chamber, the temperature and pressure prevailing in the latter, and the flow rate, temperature and pressure of the stream of gas. It must be determined in each particular case by a routine laboratory study. In practice, contents of at least 50% by volume, and preferably above 70%, are very suitable. Water vapour is preferred on account of considerations of ease of use, and it then preferably constitutes the whole of the stream of gas.

The temperature of the stream of gas is critical. It must be at least sufficient to induce boiling of the acid organic compound. It will, moreover, influence the energy of the fragmentation and, as a result, the mean size of the particle fragments formed. It consequently depends on the size required for the barium and/or strontium titanate crystals, as well as on the size of the spherical particles of the amorphous powder, on the acid organic compound employed, on the composition of the stream of gas, in particular its concentration of water vapour, ammonia and/or carbon dioxide, and on the pressure prevailing in the reactor. It may be readily determined by a routine laboratory study. It is recommended, however, that an excessive temperature, which would have the effect of degrading and crosslinking the acid organic compound before its removal from the powder, be avoided. The optimum temperature of the stream of gas must consequently be determined in each particular case by a routine laboratory study. In general, the temperature of the stream of gas be fixed at between 350° and 700° C., temperatures between 400° and 600° C. being preferred.

Preferably, the treatment of the amorphous powder with the stream of gas is carried out as soon as the heating is begun, and it is continued for a sufficient length of time to obtain a fragmentation of the particles of the powder. In practice, it can be stopped as soon as a degree of fragmentation compatible with the particle size required for the barium and/or strontium crystals has been obtained. It is consequently not essential to continue the treatment with the stream of gas until all the acid organic compound has been extracted from the powder. Generally speaking, the treatment with the stream of gas can, for example, be continued until more than 80% (and preferably at least 90%) of the amount by weight of the acid organic compound initially present has been removed from the powder. The treatment with the stream of gas can be readily monitored by measuring the concentration of organic substances in the stream of gas collected downstream of the crystallization chamber.

During the treatment with the stream of gas, the particles forming the amorphous powder shatter into fragments and barium titanate and/or strontium titanate simultaneously crystallizes. After the treatment with the stream of gas, a portion of the barium and/or strontium titanate fragments may be found to be still in the amorphous state, and it can consequently prove desirable, according to a particular embodiment of the process according to the invention, to continue heating under temperature and pressure conditions compatible with a crystallization. In this embodiment of the process according to the invention, the heating phase which follows the treatment with the stream of gas must be carried out below the sintering temperature of the powder. In practice, it is consequently recommended to carry out this heating phase at a temperature below 1,000° C., for example between 600° and 800° C. It is recommended, moreover, to work in the absence of moisture. The said heating phase is preferably continued until all of the barium and/or strontium titanate in the powder has crystallized.

In an advantageous embodiment of the process according to the invention, the abovementioned heating phase which follows the treatment with the stream of gas is carried out by means of an oxidizing gas, free from moisture, which is passed in contact with the powder. In this embodiment of the process, the oxidizing gas is a gas containing oxygen, the function of which is to burn any carbonaceous residues which may be present in the powder and may result from a partial pyrolysis of the acid organic compound during the treatment with the stream of gas containing water vapour, ammonia and/or carbon dioxide. Dry air is very suitable. In this advantageous embodiment of the process according to the invention, the time of treatment of the powder with the oxidizing gas is determined in accordance, in particular, with the flow rate of the oxidizing gas, its oxygen content, its temperature and the amount of carbonaceous residues present in the powder after the treatment with the stream of gas containing water vapour, ammonia and/or carbon dioxide, as well as with the accepted residual content of carbonaceous residues among the crystals to be produced. It is consequently not essential to continue the treatment with oxidizing gas until the powder is completely free from carbonaceous residues. Generally speaking, the treatment with the oxidizing gas can, for example, be stopped as soon as more than 80% ( and preferably at least 90%) of the amount by weight of carbonaceous residues which were present in the powder after the treatment with the stream of gas containing water vapour, ammonia and/or carbon dioxide has been extracted therefrom. The treatment with the oxidizing gas can be readily monitored by measuring the carbon dioxide concentrations in the oxidizing gas upstream and downstream, respectively, of the crystallization chamber.

In the process according to the invention, the treatment of the powder with the stream of gas containing water vapour, ammonia and/or carbon dioxide and, where appropriate, the treatment with the oxidizing gas can be carried out in all crystallization chambers suitable for bringing a gas into contact with a powder. They can, for example, be carried out in a fixed bed or fluidized bed reactor, or in a horizontal or sloping tubular chamber subjected to a rotation about its axis.

After the process according to the invention, a finely divided powder of barium titanate and/or strontium titanate crystals generally less than one micron in size and having an angular profile is obtained.

The invention consequently also relates, as a new product, to barium titanate and/or strontium titanate crystals of the type obtained by means of the process according to the invention, which are characterized by being less than one micron in size and having an irregular, angular morphology.

Barium and/or strontium titanate crystals according to the invention find application in the production of ceramic materials which, by definition, are non-metallic inorganic materials whose production from a powder requires treatments at high temperature such as fusion or sintering treatments (P. William Lee—"Ceramics" —1961—Reinhold Publishing Corp.—page 1; Kirk Othmer Encyclopedia of Chemical Technology—

Third edition—Volume 5—1979, John Wiley & Sons, USA—pages 234 to 236: "Ceramics, scope"). They also find important applications in the production of composites for the electronics industry, in particular semiconductors.

The examples, the description of which follows, serve to illustrate the invention. These examples are produced with reference to FIGS. 1 to 4 of the attached drawings.

For each of the experiments of which the description follows, an amorphous powder of mixed oxides of titanium and barium was first prepared. To this end, on the one hand a solution of 0.2 mole of titanium n-propoxide in n-propanol at 25° C., and on the other hand a solution of 0.065 mole of barium hydroxide monohydrate in a mixture of methanol and n-propanol (in the ratio of 1 volume of methanol for 2 volumes of propanol) at 25° C., were prepared separately under an anhydrous nitrogen atmosphere. 65 ml of the titanium n-propoxide solution were taken, 2.85 ml of oleic acid and 57.15 ml of n-propanol were added to it and the resulting mixture was then introduced into a reaction chamber maintained under an anhydrous nitrogen atmosphere, in which it was brought to 60° C. 200 ml of the barium hydroxide hydrate solution at 25° C. were then added to it in a single portion. The temperature of the reaction medium in the reaction chamber settled at approximately 45° C. Vigorous agitation was produced in the chamber in order to obtain a homogeneous reaction mixture rapidly before nucleation might begin. The reaction mixture was then subjected to two hours' ripening with moderate agitation at 60° C. After the ripening, the reaction mixture was subjected to a centrifugation and an amorphous powder of mixed oxides of titanium and barium was collected, washed with alcohol and then dried in a stream of nitrogen at room temperature.

Figure 2:
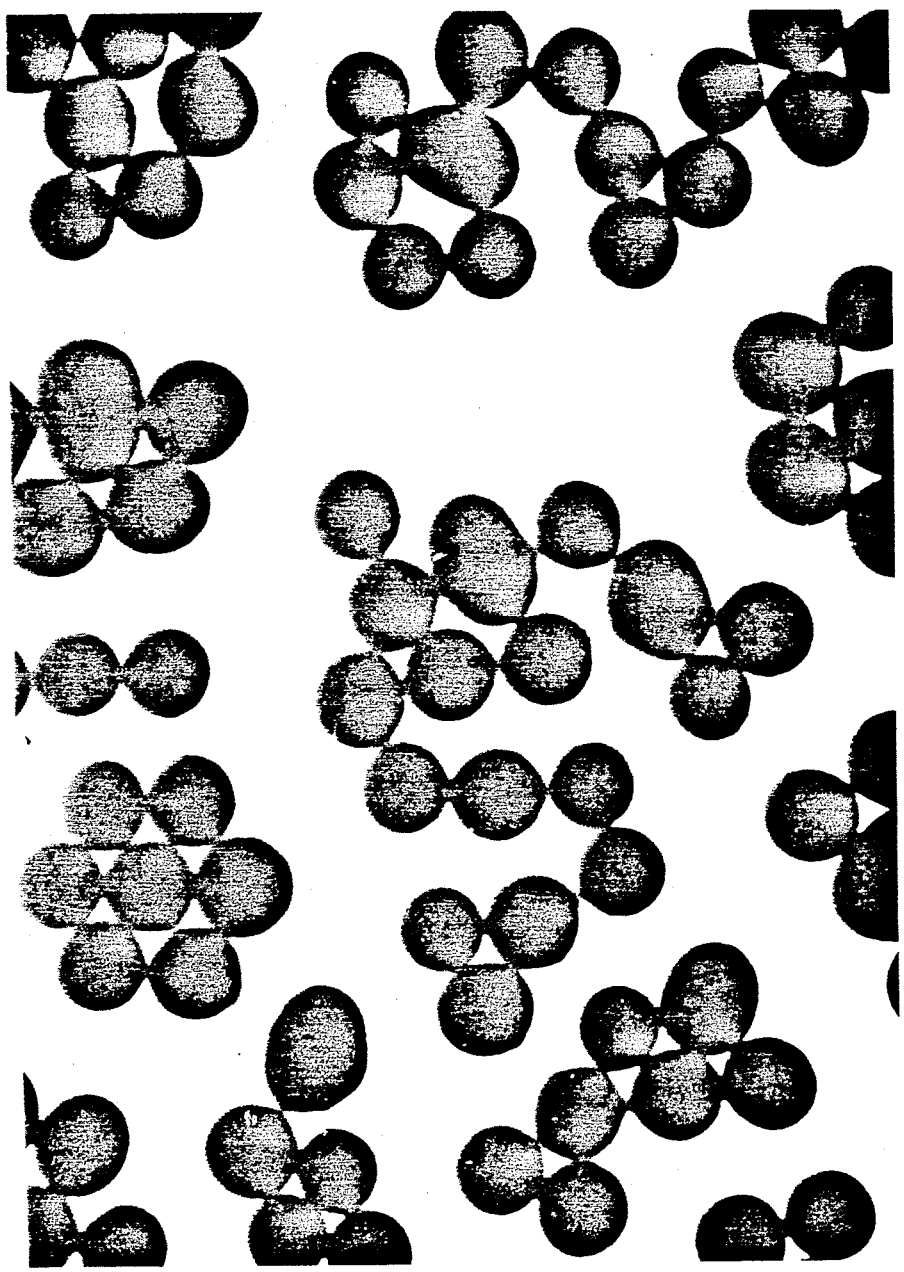
FIG. 2 is a photographic reproduction of an amorphous powder of mixed oxides of titanium and barium obtained after the hydrolysis stage of the process according to the invention, the powder being observed in the transmission electron microscope at a magnification of 20,000×.

The amorphous powder obtained after the drying was composed of spherical particles. It is shown in FIG. 2.

Ten samples of the amorphous powder thereby obtained were taken and subjected, respectively, to the ten experiments forming the subject of Examples 1 to 10 described below.

Figure 1:
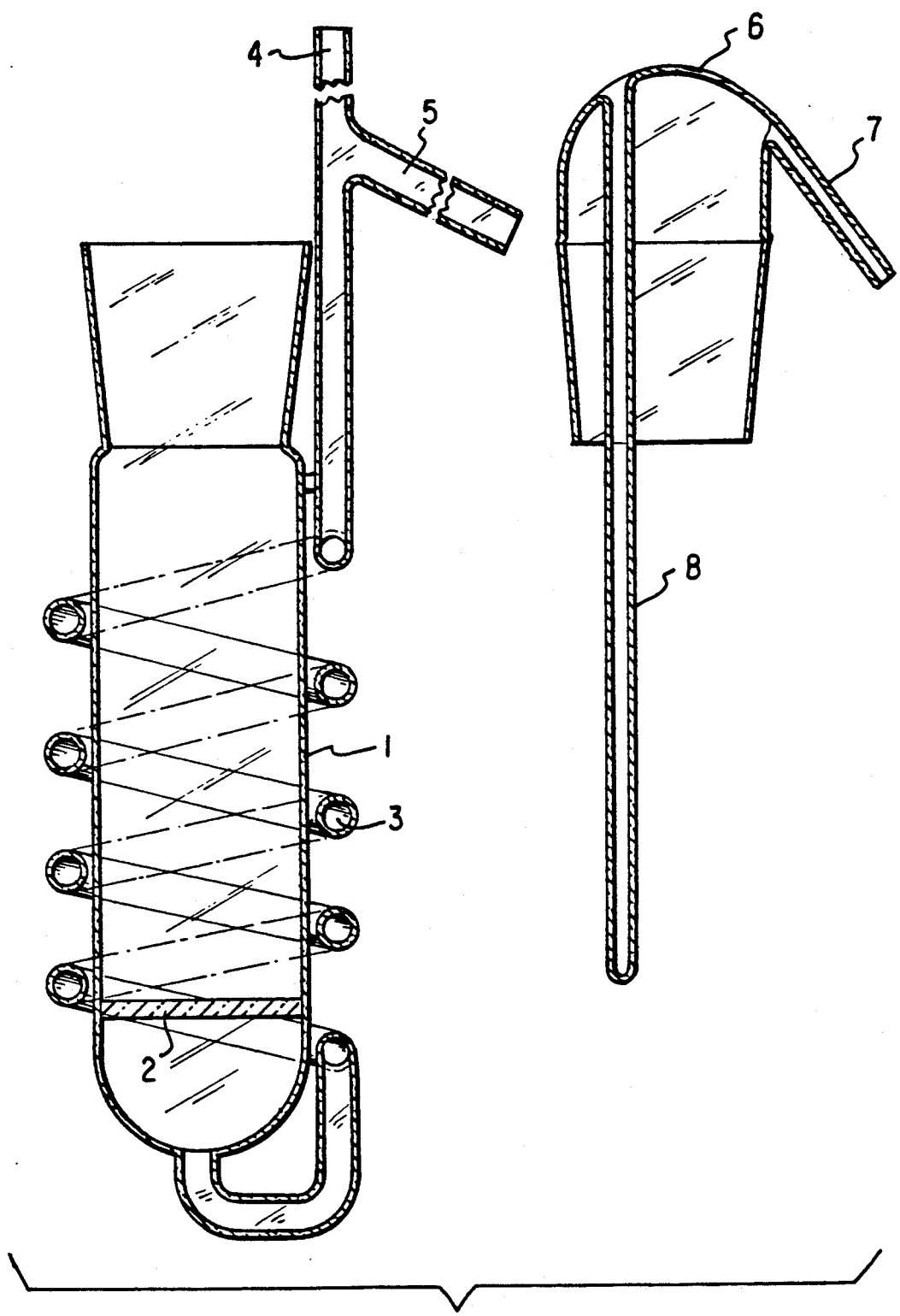
FIG. 1 shows, in elevation, a laboratory apparatus used for carrying out the process according to the invention.

To carry out these experiments, the laboratory crystallizer shown schematically in FIG. 1 was used. The latter comprises a quartz cylindrical vertical chamber 1 equipped, near the bottom, with a sintered glass porous support 2 designed to receive a sample of the powder. The end of a coil 3, also made of quartz, coiled around the chamber 1, opens into the bottom of the chamber 1. At its upper end, the coil is in communication with two tubes 4 and 5 for the admission of gases or liquids.

A removable quartz stopper 6 serves to seal the chamber 1. It is provided with a tube 7 bringing the chamber 1 into communication with the atmosphere, and a sheath 8 used for accommodating a thermocouple.

During the experiment, the crystallizer, charged with the sample of powder on the support 2, is arranged in an oven which is subjected to a heating programme defined in each example.

First series of experiments (according to the invention)

EXAMPLE 1

A 10 g sample of the amorphous powder was used in the chamber 1, and anhydrous nitrogen at atmospheric pressure was introduced into the latter via the tube 4 at a flow rate of 100 ml/min in order to purge the chamber 1 of the air contained therein. The powder was then subjected to a heat treatment in three phases.

In a first phase, the oven was heated so as to reach gradually a temperature of 450° C. in the chamber 1, this temperature then being maintained for 2 hours.

In a second phase, heating of the oven was continued in order to raise the temperature in the chamber 1 gradually to 700° C., and this latter temperature was then maintained for 4 hours.

In a third phase, heating of the oven was stopped and the sample was allowed to cool gradually therein to room temperature.

During the first phase, the flow of nitrogen was maintained continuously, and liquid water was mixed therewith, via the tube 5, at a flow rate of 15 ml/hour as soon as the temperature in the oven had reached 180° C. During its passage through the coil 3, the water rapidly vaporized, so that the stream of gas admitted at the base of the porous support 2 contained approximately 75% by volume of water vapour. After the first phase of the process, the supply of nitrogen and water was stopped, and was replaced by a stream of dry air at atmospheric pressure, at the rate of 100 ml/min. This stream of air was maintained throughout the second phase and then stopped.

The conditions of the experiment are reproduced in Table 1 below.

TABLE 1

|  | FIRST STAGE | SECOND STAGE |
|---|---|---|
| Stream of gas | nitrogen + water vapour | dry air |
| Temperature (°C.) | 450 | 700 |
| Time (hours) | 2 | 4 |

After this experiment, the sample was removed from the crystallization chamber 1. Its mass was equal to 4.9 g and it proved to consist of barium titanate crystals. Laser particle size analysis revealed that 100% of the mass of the powder was composed of individual particles less than one micron in size.

Figure 3:
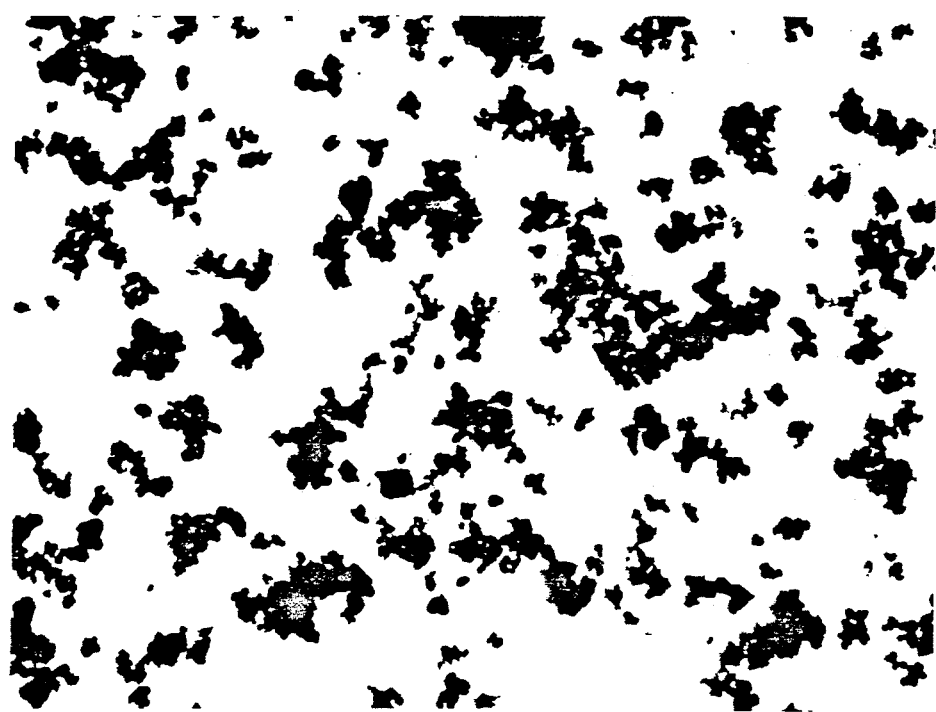
FIG. 3 is a photographic reproduction of a powder of barium titanate crystals according to the invention, obtained by crystallization of the powder of FIG. 1 and observed in the transmission electron microscope at a magnification of 20,000×.
Figure 4:
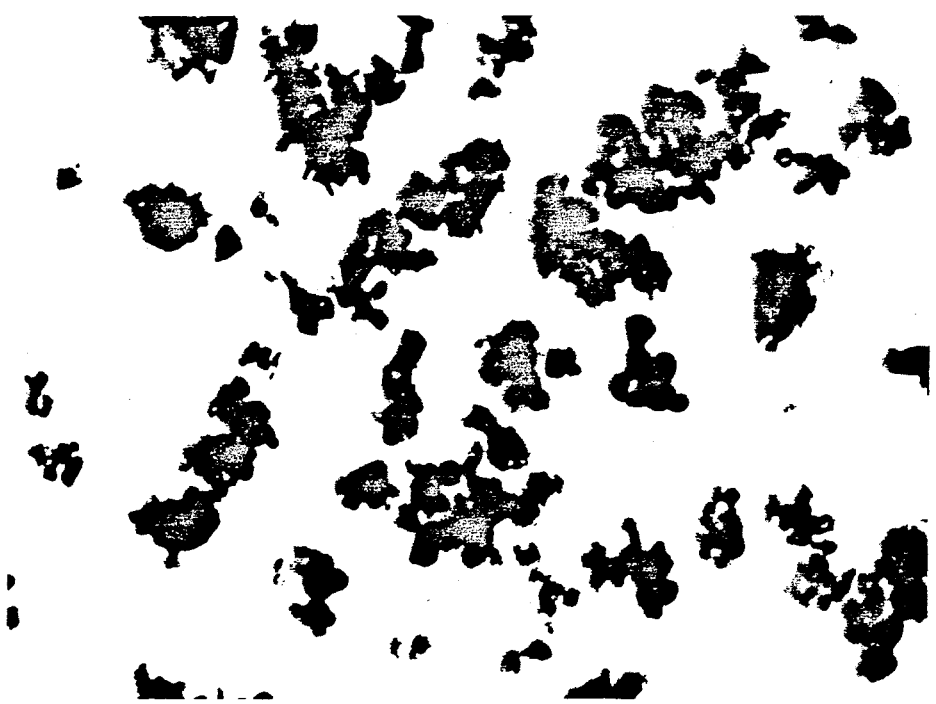
FIG. 4 shows the powder of FIG. 3, at a magnification of 40,000×.

The sample is shown in FIGS. 3 and 4.

EXAMPLE 2

The experiment of Example 1 was repeated, adopting the working conditions noted in Table 2 below.

TABLE 2

|  | FIRST STAGE | SECOND STAGE |
|---|---|---|
| Stream of gas | nitrogen + water vapour | dry air |

TABLE 2-continued

|  | FIRST STAGE | SECOND STAGE |
| --- | --- | --- |
| Temperature (°C.) | 450 | 800 |
| Time (hours) | 2 | 4 |

The sample removed from the crystallizer after the experiment had a mass of 4.8 g. It was also composed of a powder of barium titanate crystals in which all the particles were less than one micron in size.

EXAMPLE 3

All the working conditions of the experiment of Example 2 were repeated, with the sole exception that the stream of nitrogen was interrupted at the time the water vapour was admitted. Table 3 below summarizes the working conditions of the experiment.

TABLE 3

|  | FIRST STAGE | SECOND STAGE |
| --- | --- | --- |
| Stream of gas | water vapour | dry air |
| Temperature (°C.) | 450 | 800 |
| Time (hours) | 2 | 4 |

The sample which was collected after the treatment was virtually identical to that obtained in the experiment of Example 2.

EXAMPLE 4

The experiment of Example 1 was repeated, applying the following modifications thereto:
mass of amorphous powder used: 10.4 g;
stream of gas in the first phase: a mixture of nitrogen, water vapour and ammonia, obtained by introducing nitrogen (50 ml/min) via the tube 4, and an aqueous solution comprising 1 mole of ammonia per liter, at the rate of 14 ml/h via the tube 5;
temperature of the first phase: 450° C., for 4 hours;
temperature of the second phase: 775° C., for 3 hours.

The powder collected after the experiment weighed 5 g. It proved to be composed of barium titanate crystals less than one micron in size.

EXAMPLE 5

The procedure was as in Example 1, but with a stream of dry carbon dioxide (100 ml/min) substituted for nitrogen from the beginning of the experiment to the end of the first phase. The stream of gas in the chamber one during the first phase consisted of $CO_2$ alone.

The working conditions are noted in Table 4.

TABLE 4

|  | FIRST STAGE | SECOND STAGE |
| --- | --- | --- |
| Stream of gas | $CO_2$ | dry air |
| Temperature (°C.) | 450 | 800 |
| Time (hours) | 2 | 4 |

After the experiment, 4.7 g of powder were removed from the chamber 1. The powder consisted of barium titanate crystals which were all less than one micron in size.

EXAMPLE 6

The experiment of Example 5 was repeated, liquid water (9 ml/h) being introduced into the tube 5 throughout the first stage. The following working conditions were, moreover, adopted:
Temperature of the first phase: 500° C., for 5 hours;
Temperature of the second phase: 650° C. for 20 hours.

After the experiment, 5 g of a powder composed essentially of barium titanate crystals all less than one micron in size were collected.

EXAMPLE 7

The experiment of Example 1 was repeated, the following working conditions being adopted:
stream of gas introduced into the coil 3 and the crystallization chamber 1 during the first phase: mixture of nitrogen (50 ml/min) and ammonia (50 ml/min);
temperature during the first phase: 450° C., for 2 hours;
temperature during the second phase: 700° C., for 4 hours.

After the experiment, 4.9 g of powder were collected. The latter was composed of barium titanate crystals which were all less than one micron in size.

Second series of experiments (reference experiments)

In the experiments of the examples which follow, the application of one or more of the working conditions of the process according to the invention was deliberately omitted.

EXAMPLE 8

The procedure was as described in Example 1, but the introduction of water vapour into the crystallization chamber 1 during the first phase of the process was omitted.

The working conditions are summarized in Table 5.

TABLE 5

|  | FIRST STAGE | SECOND STAGE |
| --- | --- | --- |
| Stream of gas | nitrogen (100 ml/min) | dry air (100 ml/min) |
| Temperature (°C.) | 450 | 700 |
| Time (hours) | 2 | 4 |

After the experiment, 4.9 g of powder of barium titanate crystals were collected. Particle size analysis by the laser technique revealed the following particle distribution:

| MEAN DIAMETER (d) | WEIGHT FRACTION |
| --- | --- |
| $d \leq 64$ microns | 100% |
| $d \leq 50$ microns | 95% |
| $d \leq 1$ microns | 70% |

EXAMPLE 9

All the conditions of the experiment of Example 8 were reproduced, with the sole exception that nitrogen was replaced by dry air during the first step.

Laser particle size analysis revealed the following particle size distribution:

| MEAN DIAMETER (d) | WEIGHT FRACTION |
| --- | --- |
| $d \leq 64$ microns | 100% |
| $d \leq 35$ microns | 95% |
| $d \leq 3$ microns | 50% |
| $d \leq 1$ micron | 35% |

EXAMPLE 10

In this experiment, a stream of gas consisting of a mixture of air and water vapour was employed in the first stage. To this end, dry air was introduced via the tube 4 (167 ml/min) and liquid water via the tube 5 (9 ml/min). The second phase was carried out under a stream of dry air, as in Example 8. The following working conditions were, moreoever, applied:

Temperature during the first phase: 500° C., for 4 hours;

Temperature during the second phase: 775° C., for 3 hours.

After the experiment, 4.9 g of a powder composed of barium titanate having the following particle analysis were collected:

| MEAN DIAMETER (d) | WEIGHT FRACTION |
|---|---|
| d ≦ 64 microns | 100% |
| d ≦ 60 microns | 95% |
| d ≦ 1 micron | 63% |

Comparison of the results of Examples 1 to 7 (according to the invention) with those of Examples 8 to 10 shows that the omission of one or more of the conditions of the process according to the invention led to formation of agglomerates of crystals.

We claim:

1. A process for the manufacture of barium titanate, strontium titanate, or mixtures thereof, comprising:
   coprecipitating an amorphous powder of titanium oxide and barium oxide, strontium oxide, or mixtures thereof, by hydrolyzing a titanium alcoholate in the presence of an acid organic compound containing more than 6 carbon atoms in the molecule, and a barium compound, a strontium compound, or mixtures thereof, selected from oxides, hydroxides and alcoholates, and
   heating the amorphous powder to a temperature above about 400° C., distilling off said acid organic compound in a gas stream selected from the group consisting of water vapor, ammonia and carbon dioxide, said gas stream being free of oxygen and passed in contact with the amorphous powder to fragment the amorphous powder particles.

2. Process according to claim 1, characterized in that the acid organic compound is selected from carboxylic acids containing at least 8 carbon atoms in the molecule.

3. Process according to claim 1, characterized in that the acid organic compound is employed in an amount of between 20 and 200 g per mole of barium titanate and/or strontium titanate, and the water vapour, ammonia and/or carbon dioxide is employed in an amount at least equal to 50% by volume in the stream of gas.

4. Process according to claim 1, characterized in that the temperature of the stream of gas is fixed at between 350° and 700° C.

5. Process according to claim 1, characterized in that, after the acid organic compound has been distilled off, an oxidizing gas free from moisture is passed in contact with the powder.

6. Process according to claim 5, wherein the oxidizing gas is dry air.

7. Process according to claim 5, wherein the stream of gas is employed at a temperature of between 400° and 600° C., and the oxidizing gas is employed at a temperature of between 600° and 800° C.

8. Process according to claim 5, wherein the stream of gas is passed in contact with the amorphous powder until more than 80% of the amount by weight of the acid organic compound initially present in the powder has been removed, and the oxidizing gas is then passed in contact with the powder until more than 80% of the amount by weight of carbonaceous residues present in the powder after the treatment with the stream of gas has been removed.

9. Barium titanate, strontium titanate, or mixtures thereof, in the state of particles which are less than one micron in size and have an irregular, angular morphology.

10. Barium titanate, strontium titanate, or mixtures thereof, in the state of particles which are less than one micron in size and have an irregular, angular morphology, said particles being obtained by the process according to claim 1.

* * * * *